US012342850B2

(12) United States Patent
Rogan et al.

(10) Patent No.: US 12,342,850 B2
(45) Date of Patent: Jul. 1, 2025

(54) CONSUMABLE FOR AN AEROSOL GENERATING DEVICE, SYSTEM AND METHOD FOR MANUFACTURING A CONSUMABLE

(71) Applicant: JT International SA, Geneva (CH)

(72) Inventors: Andrew Robert John Rogan, Forres (GB); Lubos Brvenik, Krpelany (SK)

(73) Assignee: JT International S.A. (CH)

( * ) Notice: Subject to any disclaimer, the term of this patent is extended or adjusted under 35 U.S.C. 154(b) by 431 days.

(21) Appl. No.: 17/769,449

(22) PCT Filed: Oct. 12, 2020

(86) PCT No.: PCT/EP2020/078657
§ 371 (c)(1),
(2) Date: Apr. 15, 2022

(87) PCT Pub. No.: WO2021/074090
PCT Pub. Date: Apr. 22, 2021

(65) Prior Publication Data
US 2023/0142601 A1 May 11, 2023

(30) Foreign Application Priority Data
Oct. 15, 2019 (EP) .................................... 19203401

(51) Int. Cl.
*A24C 5/01* (2020.01)
*A24C 5/32* (2006.01)
(Continued)

(52) U.S. Cl.
CPC ................ *A24C 5/01* (2020.01); *A24C 5/327* (2013.01); *A24D 1/20* (2020.01); *A24F 40/20* (2020.01); *A24F 40/465* (2020.01); *H05B 6/105* (2013.01)

(58) Field of Classification Search
CPC ............................... A24F 40/20; A24F 40/465
See application file for complete search history.

(56) References Cited

U.S. PATENT DOCUMENTS

2014/0305449 A1* 10/2014 Plojoux .................. A24F 40/46
131/328
2017/0119054 A1* 5/2017 Zinovik .................. H05B 6/02
(Continued)

FOREIGN PATENT DOCUMENTS

CN 206137197 U 5/2017
JP 2018515115 A 6/2018
(Continued)

OTHER PUBLICATIONS

Search Report dated Sep. 1, 2022 from Office Action for Chinese Application No. 202080072238.9 issued Sep. 7, 2022. 3 pgs.
(Continued)

*Primary Examiner* — Michael H. Wilson
*Assistant Examiner* — Stephanie Lynn Moore
(74) *Attorney, Agent, or Firm* — Lerner David LLP

(57) ABSTRACT

A consumable for an aerosol generating device, methods and systems for manufacturing a consumable, and methods for using a consumable are provided. The consumable includes a columnar portion of aerosol generation substrate; and a heating element embedded in the columnar portion. The heating element includes a base portion and a plurality of elongate portions extending from the base portion along the columnar portion. The heating element is adapted to be driven towards the columnar portion via a force applied to the base portion.

7 Claims, 4 Drawing Sheets

(51) Int. Cl.

| | |
|---|---|
| ***A24D 1/20*** | (2020.01) |
| ***A24F 40/20*** | (2020.01) |
| ***A24F 40/465*** | (2020.01) |
| ***H05B 6/10*** | (2006.01) |

(56) References Cited

U.S. PATENT DOCUMENTS

| | | | |
|---|---|---|---|
| 2018/0352855 | A1 | 12/2018 | Prestia et al. |
| 2019/0000132 | A1 | 1/2019 | Prestia et al. |

FOREIGN PATENT DOCUMENTS

| | | | |
|---|---|---|---|
| JP | 2019505197 | A | 2/2019 |
| WO | 2015177253 | A1 | 11/2015 |
| WO | 2016184930 | A1 | 11/2016 |
| WO | 2017114959 | A1 | 7/2017 |
| WO | 2018041450 | A1 | 3/2018 |
| WO | 2019030170 | A1 | 2/2019 |
| WO | 2019030301 | A1 | 2/2019 |
| WO | 2019030360 | A1 | 2/2019 |
| WO | 2019136165 | A1 | 7/2019 |

OTHER PUBLICATIONS

Anonymous: "Verfahren und Vorrichtung zur Herstellung von Segmenten der Tabak verarbeitenden Industrie" Prior Art Journal, Jun. 2017, pp. 59-60, vol. 1077952576, No. 6. XP009513875.

International Search Report for Application No. PCT/EP2020/078657 mailed Dec. 10, 2020, pp. 1-6.

* cited by examiner

CONSUMABLE FOR AN AEROSOL GENERATING DEVICE, SYSTEM AND METHOD FOR MANUFACTURING A CONSUMABLE

CROSS-REFERENCE TO RELATED APPLICATIONS

The present application is a national phase entry under 35 U.S.C. § 371 of International Application No. PCT/EP2020/078657, filed Oct. 12, 2020, published in English, which claims priority to European Application No. 19203401.5 filed Oct. 15, 2019, the disclosures of which are incorporated herein by reference.

TECHNICAL FIELD

The present disclosure relates to consumables for aerosol generation devices. The consumable may comprise tobacco or other suitable aerosol substrate materials to be heated, rather than burned, to generate an aerosol for inhalation.

BACKGROUND

The popularity and use of reduced-risk or modified-risk devices (also known as vaporisers) has grown rapidly in the past few years as an aid to assist habitual smokers wishing to quit smoking traditional tobacco products such as cigarettes, cigars, cigarillos, and rolling tobacco. Various devices and systems are available that heat or warm aerosolisable substances as opposed to burning tobacco in conventional tobacco products.

A commonly available reduced-risk or modified-risk device is the heated substrate aerosol generation device or heat-not-burn device. Devices of this type generate an aerosol or vapour by heating an aerosol substrate that typically comprises moist leaf tobacco or other suitable aerosolisable material to a temperature typically in the range 150° C. to 300° C. Heating an aerosol substrate, but not combusting or burning it, releases an aerosol that comprises the components sought by the user but not the toxic and carcinogenic by-products of combustion and burning. Furthermore, the aerosol produced by heating the tobacco or other aerosolisable material does not typically comprise the burnt or bitter taste resulting from combustion and burning that can be unpleasant for the user and so the substrate does not therefore require the sugars and other additives that are typically added to such materials to make the smoke and/or vapour more palatable for the user.

It is desirable to provide a consumable that can generate an aerosol with improved energy efficiency and that can be simply manufactured.

SUMMARY OF THE DISCLOSURE

According to a first aspect, the present disclosure provides a consumable for an aerosol generating device, comprising: a columnar portion of aerosol generation substrate; and a heating element embedded in the columnar portion, the heating element comprising a base portion and a plurality of elongate portions extending from the base portion along the columnar portion, the heating element being adapted to be driven towards the columnar portion via a force applied to the base portion.

Optionally, the heating element is an inductive heating element.

Optionally, the heating element comprises two elongate portions arranged at respective ends of the base portion to form a U-shape.

Optionally, the heating element has a substantially similar cross-section throughout the base portion and the plurality of elongate portions.

Optionally, the heating element is a wire bent to form the base portion and the plurality of elongate portions.

Optionally, the aerosol generation substrate is a solid material or is a loose material held by a wrapping around the columnar portion, and the heating element is embedded in the aerosol generation substrate.

Optionally, the base portion is arranged at an open end of the columnar portion.

According to a second aspect, the present disclosure provides a system for manufacturing a consumable as described above, comprising: a holding means adapted to receive a consumable comprising a columnar portion; and a heating element driver arranged to face the holding means, the heating element driver being configured to drive a heating element towards an end of the columnar portion.

Optionally, the system comprises: a drum comprising a plurality of the holding means arranged at respective indexed positions around the drum, each holding means being adapted to receive a respective consumable, the drum being configured to undergo indexed rotation, wherein a heating element driver arranged to face a first indexed position around the drum, the heating element driver being configured to drive a heating element towards an end of a columnar portion of a consumable that is in the holding means at the first indexed position.

Optionally, the system further comprises a hopper arranged to store a plurality of columnar portions of aerosol generation substrate and to feed the plurality of columnar portions towards a second indexed position around the drum.

Optionally, the first indexed position and the second indexed position are different positions.

Optionally, the drum is arranged to rotate around a substantially horizontal axis, and the second indexed position is a top position.

Optionally, the holding means are adapted to drop the respective columnar portion after the drum has rotated through a predetermined number of indexed positions from when the respective columnar portion was arranged in the holding means at the second indexed position.

Optionally, the heating element driver is a staple gun.

According to a third aspect, the present disclosure provides a method for manufacturing a consumable as described above, comprising: arranging an end of a columnar portion of aerosol generation substrate to face a heating element driver; and using the heating element driver to drive a heating element towards the end of the columnar portion.

According to a fourth aspect, the present disclosure provides a method of generating an inhalable aerosol, comprising: inserting a consumable as described above into a heating chamber, the heating chamber comprising a driving element configured to drive the heating element; and heating the columnar portion of aerosol generation substrate using the heating element to generate the inhalable aerosol.

DETAILED DESCRIPTION

Figure 1A:
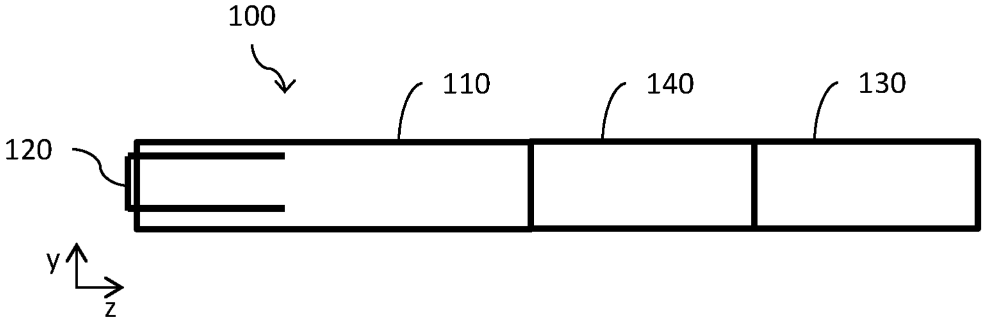
FIG. 1A is a schematic illustration of a consumable according to the invention.

FIG. 1A schematically illustrates a consumable according to an embodiment of the invention.

Referring to FIG. 1A, the consumable 100 comprises a columnar portion 110 of aerosol generation substrate. In general, consumables for aerosol generation devices are relatively long in one direction (labelled in FIG. 1A as the z direction) with a relatively small cross-section perpendicular to the 'long' direction. In such consumables, a 'columnar' portion refers to a portion extending along the 'long' direction. Although reference to such consumables is convenient for explaining the invention, the invention is equally applicable to consumables where no such 'long' direction may be discerned, in which case the 'columnar' portion may be any portion of aerosol generation substrate.

The columnar portion may, for example, comprise a solid aerosol substrate material, or a loose aerosol substrate material held by a wrapping around the columnar portion. The aerosol substrate may, for example, comprise a tobacco material in various forms such as shredded tobacco and granulated tobacco, and/or the tobacco material may comprise tobacco leaf and/or reconstituted tobacco. The wrapping may, for example, comprise paper and/or other textile materials. The wrapping may also comprise various organic materials and/or inorganic materials.

A heating element 120 is embedded in the columnar portion 110. The heating element 120 is preferably embedded in the aerosol generation substrate itself, but may alternatively be adjacent to the aerosol generation substrate. For example, the heating element 120 may be located between the aerosol generation substrate and a wrapping. The heating element 120 may, for example, be an inductive heating element (also called a susceptor) that is configured to receive energy via electromagnetic induction and dissipate the received energy to perform heating. Alternatively, the heating element 120 may be a conductive heating element configured to receive energy via an electric current. The heating element may typically comprise an electrically conductive material, including a metallic material such as aluminium, iron, alloy steel, copper, etc., and/or a non-metallic material such as graphite, silicon carbide, etc.

As shown in FIG. 1A, the consumable 100 may further comprise a tube section 140 between a filter 130 and the columnar portion 110. The tube section can be used to allow the generated aerosol to cool before it reaches a mouth end of the consumable.

Figure 1B:
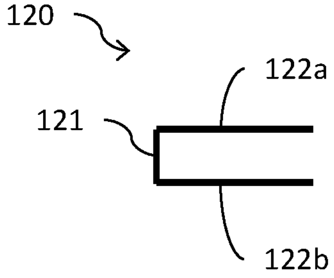
FIGS. 1B and 1C is are schematic illustrations of examples of a heating element.

Detail of a first example of a heating element 120 is shown in FIG. 1B.

Referring to FIG. 1B, the heating element 120 comprises a base portion 121 and a plurality of elongate portions 122*a*, 122*b* extending from the base portion 120. When embedded in the columnar portion 110, the elongate portions are arranged to extend along the columnar portion. That is, the elongate portions are arranged to extend along the 'long' direction of the columnar portion.

With this arrangement of the elongate portions, an inductive heating element may conveniently be powered by surrounding the columnar portion with a solenoid. With such an arrangement, the magnetic field of the solenoid can be parallel to the elongate portions, inducing currents around their surface area. Furthermore, even if the heating element is not an inductive heating element, arranging the elongate portions along the columnar portion improves the uniformity of heating of the aerosol substrate.

Figure 2:
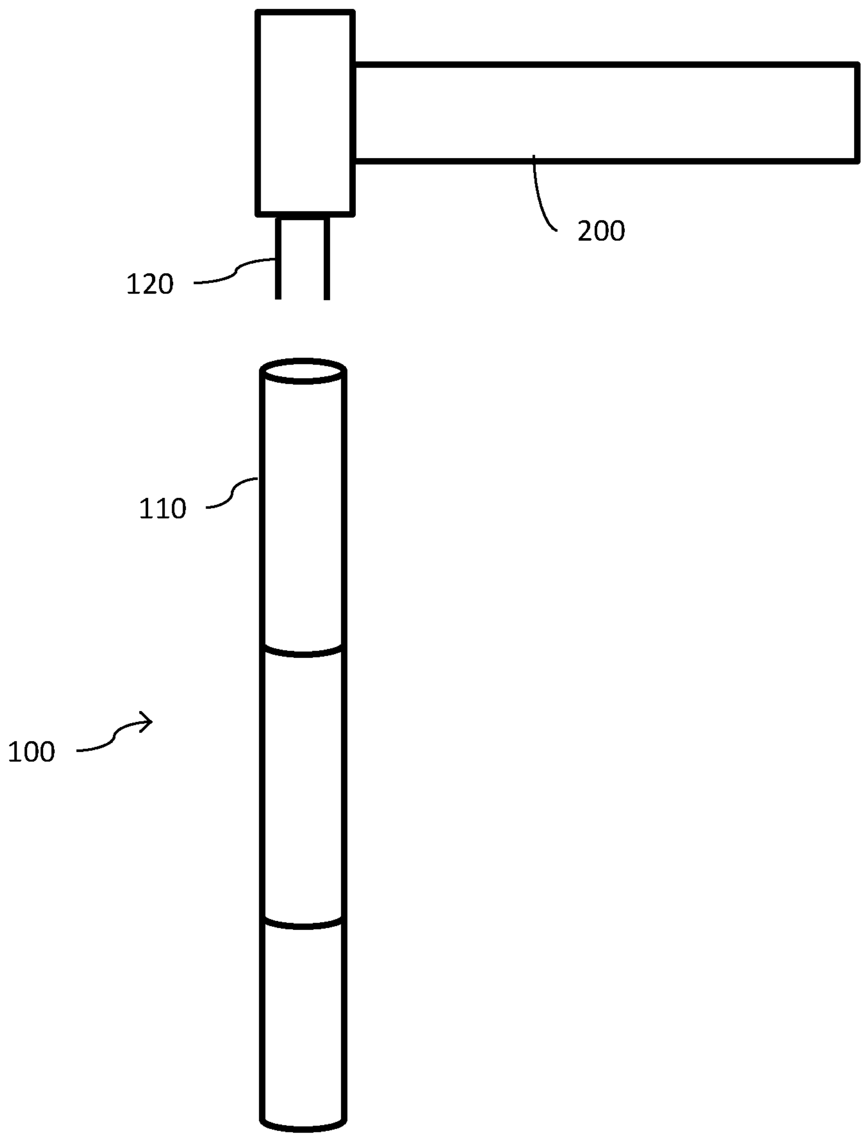
FIG. 2 is a schematic illustration of a method of manufacturing the consumable.

This arrangement of a base portion and a plurality of elongate portions also means that the heating element is adapted to be driven towards the columnar portion 110 via a force applied to the base portion 121 (as shown in FIG. 2, described later). In particular, the base portion 121 provides a surface for driving, while the elongate portions 122*a*, 122*b* are arranged to penetrate through the columnar portion 110 with lower resistance than the base portion 121.

In the example of FIG. 1B, the heating element 120 has two elongate portions 122*a*, 122*b*, which are arranged at respective ends of the base portion 121 to form a U-shape. Using at least two elongate portions spread as far apart as possible along the base portion has the effect of stabilising the heating element 120 as it is driven into the columnar portion 110, and increasing the number of elongate portions 122 increases the amount of material required for the heating element 120. Therefore, a U-shape balances the requirements of stability when driving the heating element and reducing the amount of material required for the heating element.

The heating element 120 may advantageously have a substantially similar cross-section throughout the base portion and the plurality of elongate portions. This simplifies the manufacture of the heating element 120 by enabling usage of a long material with substantially uniform cross-section to form the heating element. Additionally, the substantially similar cross-section of the base portion and elongate portions means that the current is substantially uniform on the surface of the elongate portions, and uniformity of the heat distribution from the heating element is increased.

Figure 1C:
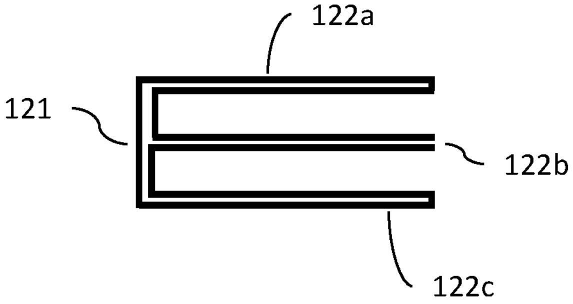

More preferably, the heating element 120 may be formed from a wire that is bent to form the base portion and the plurality of elongate portions. For example, FIG. 1C shows a second example of a heating element 120 which has three elongate portions formed from a wire. The ends of the wire form a middle elongate portion 122*b*, and a middle portion of the wire is bent to form outer elongate portions 122*a* and 122*c* as well as the base portion 121. Bending a wire avoids the need to attach any of the base portion and elongate portions together, thus further simplifying the manufacture of the heating element 120.

Figure 1D:
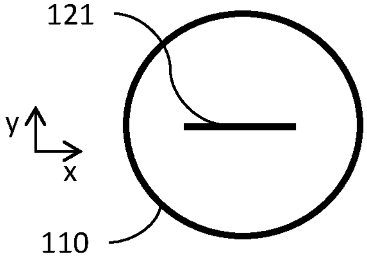
FIG. 1D and FIG. 1E are schematic illustrations of an end of the consumable with different examples of a heating element.

FIG. 1D is a rotated view of the consumable of FIG. 1A, from an end perspective where the z direction of FIG. 1A extends into the page. FIG. 1D illustrates the base portion 121 of the heating element extending across the end of the columnar portion 110, while the elongate portions (not shown) extend from the base portion into the columnar portion 110.

Figure 1E:
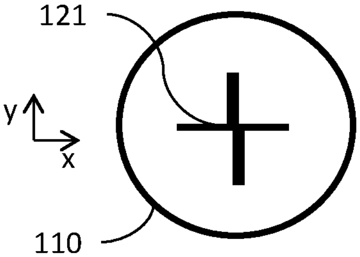

FIG. 1E is view from the same perspective as FIG. 1D, for a further example of a heating element 120. In this example, the base portion 121 has a crossed shape and an elongate portion (not shown) extends from each of the four ends of the crossed shape. The crossed shape is slightly distorted in this example, because this represents a crossed shape formed by bending a long material with substantially uniform cross-section multiple times to form the elongate portions and the base portion. By providing a base portion which can support a two-dimensional arrangement of elongate portions, the stability of the heating element as it is driven into the columnar portion is improved, and the uniformity of heat delivery to the columnar portion is improved.

Referring back to FIG. 1A, the base portion 121 is preferably arranged at an open end of the columnar portion 110. In a common consumable design, the consumable comprises a filter 130 at a mouth end of the consumable. In such a design, the open end is opposed to the mouth end. This arrangement of the heating element 120 means that the heating element 120 can be added last to an almost-complete consumable.

More specifically, in FIG. 1A, the base portion 121 is close to but not actually embedded in the open end of the columnar portion 110, while the elongate portions are almost entirely embedded. Alternatively, the heating element 120 may be entirely embedded in the columnar portion 110 to improve the efficiency of heat delivery to the aerosol generation substrate.

Furthermore, if the heating element 120 is added to the columnar portion 110 before assembly of any other elements of the consumable such as filter 130, then the base portion 121 may be driven into and arranged at an end of the columnar portion 110 which will ultimately be closer to the mouth end of the consumable once fully manufactured.

In other consumables, no filter is included with the consumable, and the 'open end' may be either end of the columnar portion.

FIG. 2 illustrates a method for manufacturing a consumable as described above.

As shown in FIG. 2, a columnar portion 110 (which may already be part of a consumable comprising a filter 130) is arranged with an end facing a heating element driver 200. The heating element driver 200 is then used to drive a heating element 120 towards the end of the columnar portion 110.

The heating element driver 200 may be similar to a conventional staple gun or nail gun, adapted to hold and drive a heating element 120 as described above.

The columnar portion 110 may be arranged immediately adjacent to the heating element driver 200, such that the heating element 120 can be held by the heating element driver 200 while being driven into the columnar portion. Alternatively, the columnar portion 110 may be arranged at a distance from the heating element driver 200, such that the heating element driver 200 drives the heating element 120 towards the columnar portion by firing the heating element 120 with a sufficient force applied to the base portion 121 for the heating element to be driven into the columnar portion upon impact.

In a simple embodiment, this method may be performed manually by using a hand-held heating element driver 200 and/or by holding the columnar portion 110 to face the heating element driver 200.

Alternatively, the method may be performed by a system comprising the heating element driver 200, as well as a holding means arranged to face the holding means and adapted to receive the columnar portion 110 or a consumable 100 comprising the columnar portion 110. An example of such a system is schematically shown in FIG. 3.

Figure 3:
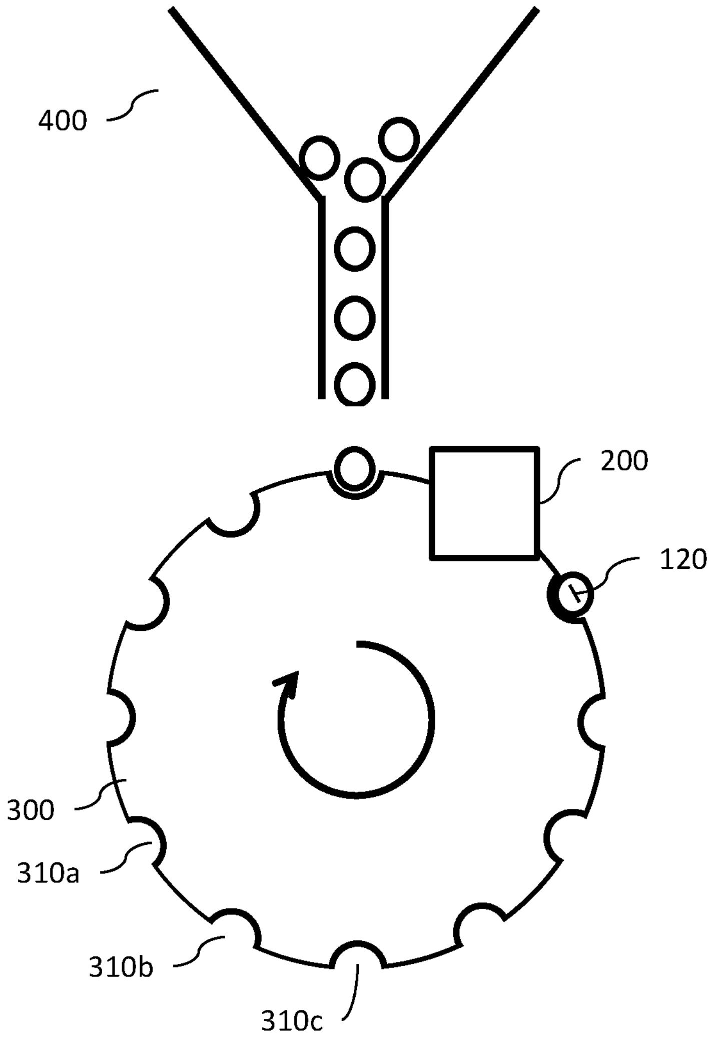
FIG. 3 is a schematic illustration of a system for manufacturing the consumable.

In the example of FIG. 3, the system comprises a drum 300. The drum has a plurality of holding means 310*a*, 310*b*, 310*c* arranged at respective indexed positions around the drum, where each holding means is adapted to hold a respective columnar portion 110 (which may already be part of a consumable). The holding means may, for example, be indentations or grooves in an external surface of the drum. In this example, grooves at least as long as the 'long' direction of columnar portion 110 (the z direction in FIG. 1) are provided, and the columnar portion 110 is held along the groove. The holding means may each optionally have an actuator for actively holding and releasing a columnar portion 110.

The heating element driver 200 is arranged statically to face a first indexed position of the drum 300. The drum 300 is configured to undergo indexed rotation such that, upon each rotation of the drum 300, a new holding means (and thus a new columnar portion) is arranged in the first position to face the heating element driver 200.

For example, the drum 300 illustrated in FIG. 3 has twelve equally-spaced holding means 310*a*, 310*b*, 310*c*. In this example, each indexed rotation of the drum is one twelfth of a complete rotation. More generally, the drum may have any number of holding means, and it is not necessary for the holding means to be equally spaced around the drum, so long as rotation of the drum is controlled according to the positions of the holding means.

With this system, a plurality of consumables according to the invention can be manufactured by alternating between: the drum 300 rotating by one position; and the heating element driver 200 driving a heating element 120 towards a columnar portion 110 that is currently in the first position.

Columnar portions 110 lacking a heating element 120 can be added to the drum 300 using a hopper 400. More specifically, a hopper 400 may be arranged to store a plurality of columnar portions 110 and to feed the plurality of columnar portions 110 towards a second indexed position around the drum 300. In this embodiment, the columnar portions 110 are fed one-by-one into respective holding means 310*a*, 310*b*, 310*c* when each respective holding means is at the second position that is adjacent to the hopper 400.

The second position may be the same as the first position associated with the heating element driver 200. However, the second position is preferably different from the first position. By arranging the heating element driver 200 and the hopper 400 adjacent to different indexed positions, the columnar portion 110 has more time to settle in the respective holding means 310*a*, 310*b*, 310*c* before application of the heating element 120. This reduces the required precision for control of the timing of operation of the hopper 400 and operation of the heating element driver 200.

Each columnar portion 110 can be added to the drum using gravity. This can be achieved by arranging the drum 300 to rotate around a substantially horizontal axis, and by arranging the hopper 400 to feed the columnar portions 110 towards a second position that is at or near to a top position around the drum 300. Each columnar portion 110 enters a respective holding means 310 at the second position through an opening in the holding means. In this example, the hopper 400 is arranged to feed each columnar portion 110 such that the columnar portion 110 enters the respective holding means 310 perpendicular to the 'long' direction of columnar portion 110 (the z direction in FIG. 1).

Each columnar portion 110 (or complete consumable) can similarly be removed from the drum 300 using gravity, after addition of the heating element 120. This can be achieved adapting an opening in each holding means 310 such that the holding means 310 supports the columnar portion 110 while the drum 300 rotates through a predetermined number of indexed positions from when the respective columnar portion 110 was arranged in the holding means 310 at the second indexed position (i.e. a predetermined number of positions from the vertical in FIG. 3), and thereafter allows the columnar portion to fall back out of the holding means 310 through the opening. For example the holding means may be passively shaped or actively controlled such that the columnar portion is held stably in the holding means for up to 120° rotation from the vertical position, and the columnar portion will fall out of the holding means when the holding means is at more than 120° from the vertical around the drum.

In another example, a modified drum 300' may be arranged to rotate on a substantially vertical axis, and fed and/or emptied under gravity. In this example, the columnar portions 110 (or complete consumables) may enter and/or leave the drum 300' parallel to the 'long' direction of columnar portion 110 (the z direction in FIG. 1). For example, a modified feeder 400' may be positioned above a second indexed position, and configured to supply the columnar portions 110 in a vertical orientation such that each columnar portion 110 enters the drum 300 parallel to the 'long' direction. Similarly, the drum 300' may be adapted to release columnar portions 110 from a respective holding means 310 at a third indexed position. This may be achieved by providing a solid plate under the drum 300', which does not rotate and which has a hole at the third indexed position to allow the columnar portion 110 to fall out of the holding means 310 under gravity.

The system may further comprise an electronic controller configured to automatically control one or more of the heating element driver 200, the drum 300 and the hopper 400. The system may further comprise one or more sensors configured to detect, for example, whether a columnar portion 110 is present in a holding means currently arranged in the first position and/or to detect whether or not a columnar portion 110 in a holding means already has a heating element 120 embedded therein. The system may alternatively be operated by a human operator.

In other embodiments of the system, the drum 300 could be replaced with a conveyor belt comprising a plurality of holding means. The system could otherwise be similar, with a heating element driver 200 arranged to face a first position along the conveyor belt, and a hopper 400 arranged to feed columnar portions 110 towards a second position along the conveyor belt.

Furthermore, in other embodiments, the system could be adapted to operate continuously, without stepped motion, by attaching one or more heating element drivers 200 to the drum 300 (or the conveyor belt).

Figure 4A:
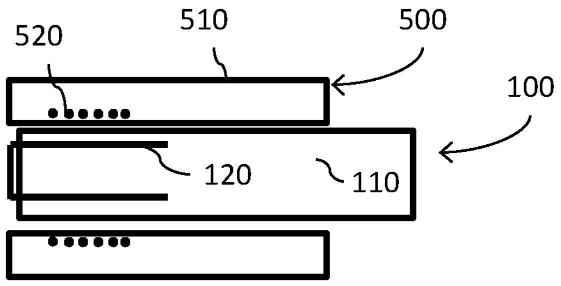
FIGS. 4A and 4B are schematic illustrations of a consumable in use in examples of an aerosol generating device.
Figure 4B:
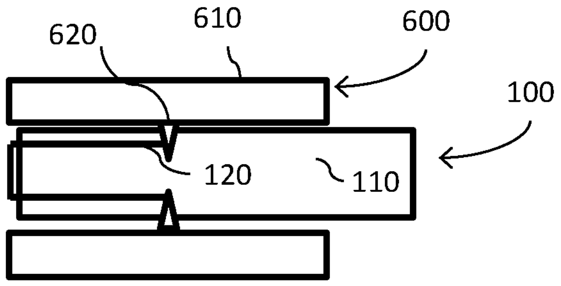

FIGS. 4A and 4B show examples of usage of a consumable as described above to generate an aerosol.

FIG. 4A schematically illustrates a consumable 100 in an aerosol generation device 500.

The aerosol generation device 500 comprises a heating chamber 510 comprising a driving element 520 configured to drive the heating element 120 of the consumable 100. In this example, the driving element 520 is a solenoid coil arranged to generate a magnetic field in the heating chamber 510. The magnetic field induces a current in the heating element 120 to perform heating of the columnar portion of aerosol substrate 110.

In order to generate an inhalable aerosol, a user may insert the consumable 100 into the heating chamber 510, and heat the columnar portion 110 using the heating element 120 to generate the inhalable aerosol.

In this example, the consumable 100 does not have a filter 130 or tube section 140. Such a simple consumable may, for example, be used in a case where the aerosol generation device itself has a mouthpiece and a filter (not shown) from which a user may obtain the generated aerosol.

FIG. 4B schematically illustrates a consumable 100 in a second aerosol generation device 600.

The aerosol generation device 600 also comprises a heating chamber 610 and a driving element 620. However, in this example, the driving element 620 comprises piercing elements arranged to penetrate the columnar portion 110 and make electrical contact with the heating element 120 in order to drive a current through the heating element. The driving element 620 may be retractable in order to allow a consumable to be added to and removed from the heating chamber 610.

In order to generate an inhalable aerosol, a user may insert the consumable 100 into the heating chamber 610, and heat the columnar portion 110 using the heating element 120 to generate the inhalable aerosol.

The invention claimed is:

1. A consumable for an aerosol generating device, comprising:

a columnar portion of aerosol generation substrate; and a heating element embedded in the columnar portion, the heating element comprising a base portion and a plurality of elongate portions extending from the base portion along the columnar portion, the heating element being adapted to be driven towards an end of the columnar portion via a force applied to the base portion, wherein the heating element is bent to form the base portion and the plurality of elongate portions.

2. The consumable according to claim 1, wherein the heating element is an inductive heating element.

3. The consumable according to claim 1, wherein the plurality of elongate portions comprises two elongate portions arranged at respective ends of the base portion to form a U-shape.

4. The consumable according to claim 1, wherein the heating element has a substantially similar cross-section throughout the base portion and the plurality of elongate portions.

5. The consumable according to claim 1, wherein the heating element is a wire.

6. The consumable according to claim 1, wherein the aerosol generation substrate is a solid material or is a loose material held by a wrapping around the columnar portion, and the heating element is embedded in the aerosol generation substrate.

7. The consumable according to claim 1, wherein the base portion is arranged at an open end of the columnar portion.

* * * * *